United States Patent
Englund et al.

(10) Patent No.: US 8,358,972 B2
(45) Date of Patent: Jan. 22, 2013

(54) POWER CONTROL IN A RADIO BASE STATION WITH SUSTAINED CELL RADIUS

(75) Inventors: Michael Englund, Sigtuna (SE); Jacob Osterling, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 12/866,155

(22) PCT Filed: Feb. 5, 2008

(86) PCT No.: PCT/SE2008/050144
§ 371 (c)(1),
(2), (4) Date: Aug. 4, 2010

(87) PCT Pub. No.: WO2009/099355
PCT Pub. Date: Aug. 13, 2009

(65) Prior Publication Data
US 2010/0317395 A1    Dec. 16, 2010

(51) Int. Cl.
*H04B 7/185* (2006.01)
(52) U.S. Cl. .................................... 455/13.4; 455/450
(58) Field of Classification Search .............. 455/522, 455/13.4, 450, 451, 452.1
See application file for complete search history.

(56) References Cited

U.S. PATENT DOCUMENTS 7,091,780 B2 *   8/2006   Bienek et al. ............... 330/149
7,184,722 B1 *   2/2007   Johnson et al. ........... 455/127.1

FOREIGN PATENT DOCUMENTS

| JP | 2003347993 A | 12/2003 |
| WO | 02/33845 A2 | 4/2002 |
| WO | 2006/071265 A1 | 7/2006 |

* cited by examiner

*Primary Examiner* — Tu X Nguyen
(74) *Attorney, Agent, or Firm* — Coats & Bennett, P.L.L.C.

(57) ABSTRACT

A method and apparatus is described herein for controlling the operating temperature of radio equipment (44, 46) in a radio base station (10) while preventing a decrease in power of a common channel. A radio base station (10) according to the present invention includes a radio unit (40) and a control unit (20). The radio unit (40) determines a temperature of the radio unit (40), e.g., by determining a temperature of high power radio equipment (46) in the radio unit (40). The control unit (20) allocates a desired power to the common channel, determines an available power for dedicated and/or shared channels based on the allocated power for the common channel and a power limit derived from the determined temperature, and allocates the available power to the dedicated and/or shared channels.

26 Claims, 5 Drawing Sheets

POWER CONTROL IN A RADIO BASE STATION WITH SUSTAINED CELL RADIUS

TECHNICAL FIELD

The present invention generally relates to radio base stations in wireless communication systems, and more particularly to controlling the size, transmission power, and operating temperature of radio elements in a radio base station.

BACKGROUND

Wireless communication systems include Radio Base Stations (RBSs) that communicatively link wireless devices, such as cellular telephones, to a network system. Recently, a collaboration between multiple wireless providers produced the Common Public Radio Interface (CPRI) standard. The architecture for the CPRI standard separates the radio and controlling elements of an RBS by placing all control elements of the RBS in a Radio Equipment Controller (REC), and placing all radio elements in a Radio Equipment (RE) unit. The CPRI standard also defines an interface between the RE and REC. This architecture enables flexible and efficient product differentiation for RBSs and independent technology evolution for the RE and REC. Further, the CPRI architecture enables the REC and the RE to be remotely located from each other.

Because the RE is usually co-located with the antenna in the field, the size of the RE is commercially important, particularly for Long Term Evolution (LTE) and Wideband Code Division Multiple Access (WCDMA) systems. The size of the cooling fins required for cooling the radio elements primarily drives the size of the RE. Thus, minimizing the size and/or number of the cooling fins significantly reduces the size of the RE. The amount of power dissipation and operating temperature of the radio elements in the RE, along with the ambient temperature range of the environment surrounding the RE drive the size and/or number of the cooling fins.

To help control the size and/or number of the cooling fins, and therefore the RE, a conventional RE may include a self-protection mechanism that prevents the power dissipation of the RE from exceeding a predetermined maximum. The self-protection mechanism decreases the power output by the RE when the temperature reaches a predefined threshold. Such self-protection mechanisms decrease the power of all transmissions on the common, dedicated, and shared channels from the RE. However, decreasing the power of transmissions on the common channel decreases the cell radius of the RBS, which may result in dropped calls, limited coverage, etc.

SUMMARY

The present invention provides a method and apparatus for controlling the operating temperature of radio elements in a radio base station while preventing a decrease in a common channel transmission power. A radio base station according to the present invention includes a radio unit comprising radio elements and a control unit comprising controlling elements. The radio unit determines its temperature, e.g., by determining a temperature of high power radio elements in the radio unit. The control unit allocates power to a first group of channels, e.g., common channels, determines an available power for a second group of channels, e.g., dedicated and shared channels, based on the allocated power for the first group of channels and a power limit derived from the determined temperature, and allocates the available power to the second group of channels. In one embodiment, the radio unit determines the power limit from the temperature and provides the power limit to the control unit. In another embodiment, the control unit receives the temperature from the radio unit and determines the power limit based on the temperature.

By determining an available power for the dedicated and shared channels based on the temperature of the radio unit and allocating the available power to the dedicated and shared channels, the present invention controls the temperature of the radio unit without compromising the power available to the common channel. This enables the radio unit to utilize smaller and/or fewer cooling fins, which enables the design and construction of smaller radio units.

DETAILED DESCRIPTION

Figure 1:
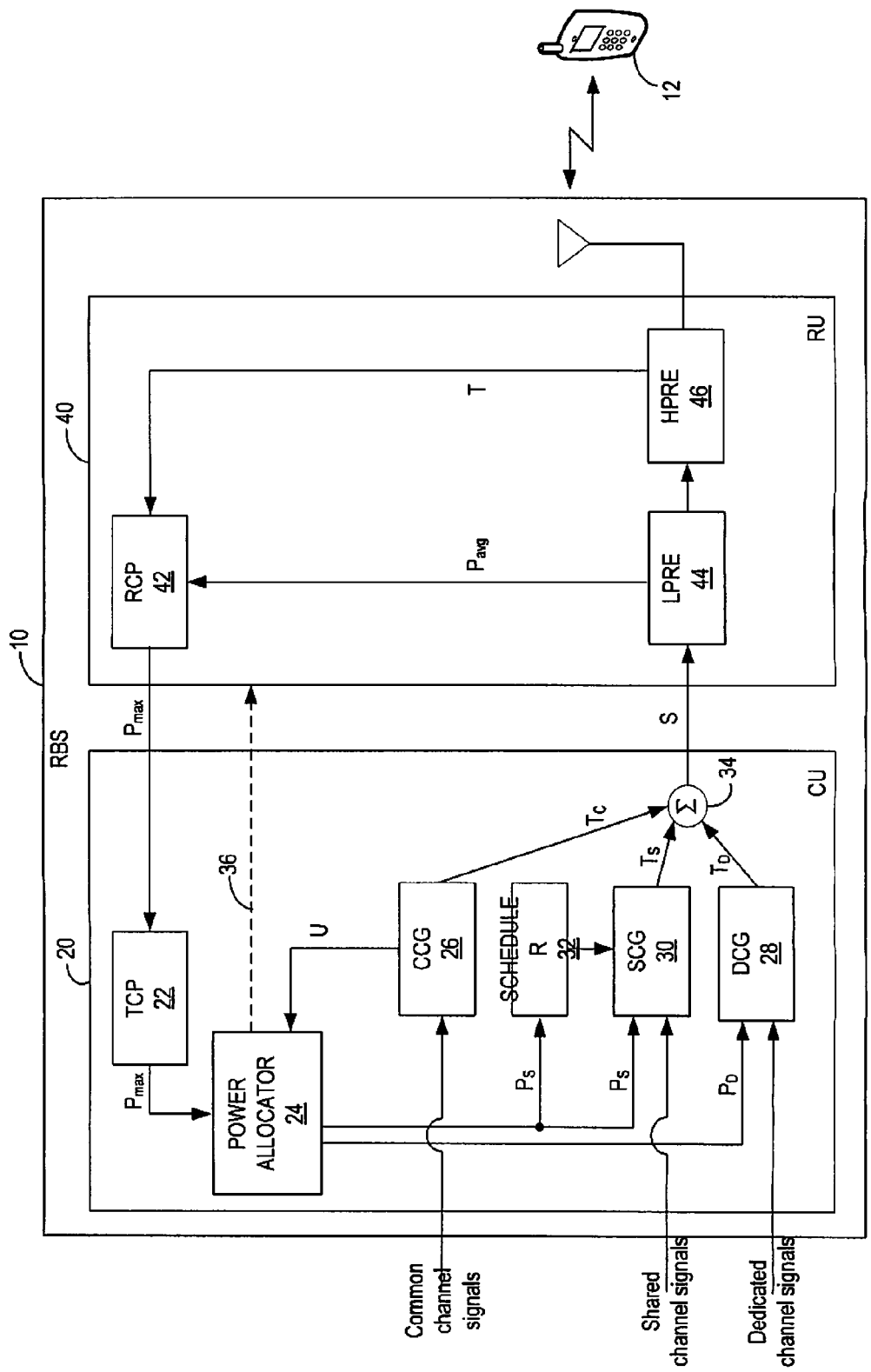
FIG. 1 shows a block diagram of a radio base station in communication with a wireless communication device according to one exemplary embodiment of the present invention.

FIG. 1 shows an exemplary radio base station (RBS) 10 in communication with a wireless communication device 12. RBS 10 includes a control unit (CU) 20 and a radio unit (RU) 40. The radio unit 40 includes the radio equipment, such as transmitters and receivers, for communicating with the wireless communication device 12. The control unit 20 comprises the control elements to control operation of the RBS 10. The control unit 20 and radio unit 40 communicate via any desired interface, such as the Common Public Radio Interface (CPRI). When associated with the CPRI standard, control unit 20 corresponds to the REC and radio unit 40 corresponds to the RE. It will be appreciated that the control unit 20 and radio unit 40 may be co-located or may be remotely located from each other.

Radio unit 40 transmits signals to the wireless communication device 12 on different channels. Exemplary channels include common, dedicated, and/or shared channels. For example, the radio unit 40 may transmit a signal comprising a pilot signal on a common channel and a user traffic signal on a dedicated channel.

Figure 2:
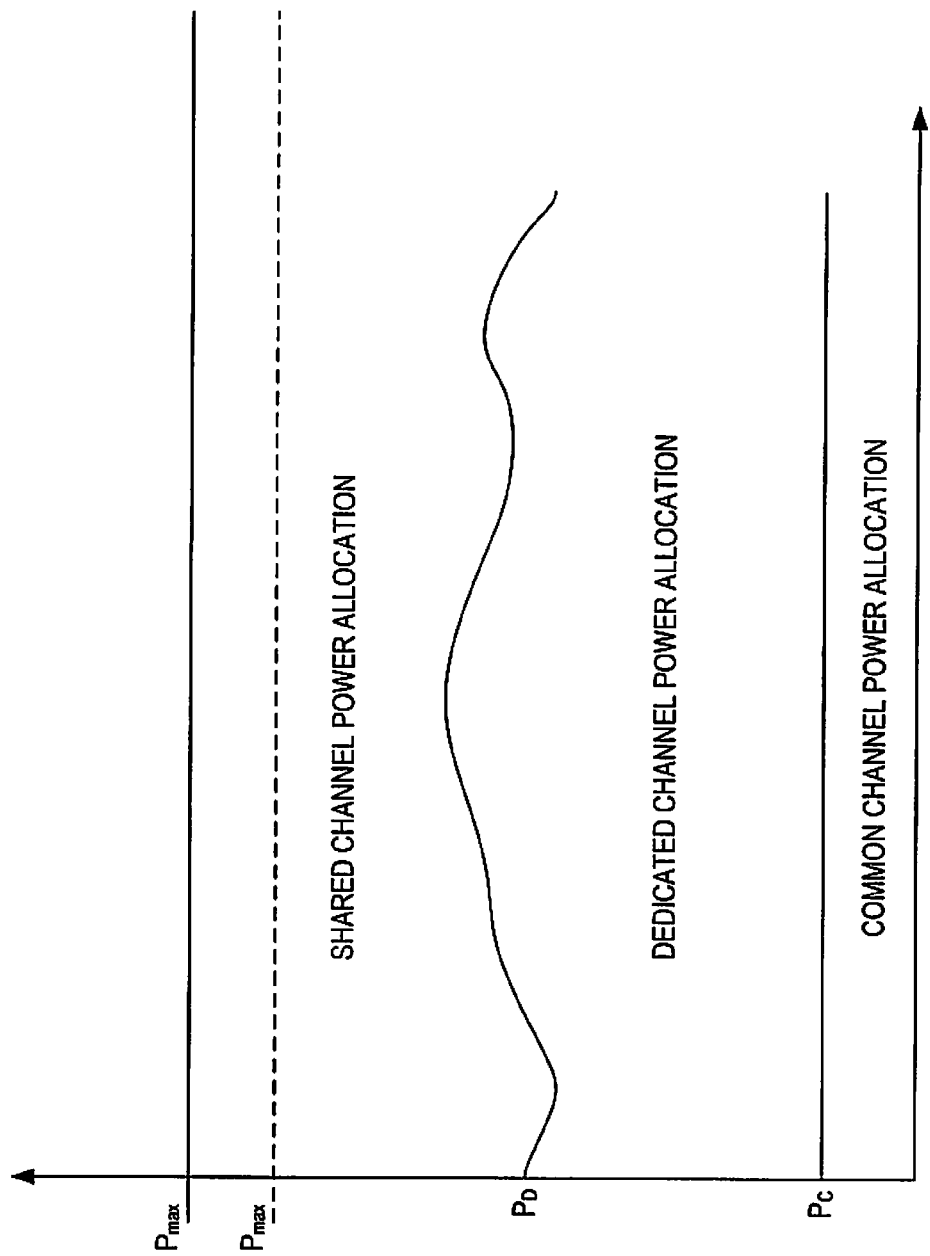
FIG. 2 shows a power plot for transmissions on various channels.

FIG. 2 shows a power plot for the common, dedicated, and shared channels. A maximum mean power ($P_{max}$) is allocated to the RBS 10. A fixed amount of $P_{max}$ is available for the common channels. The remainder is allocated to the dedicated and shared channels. Typically, the dedicated channels use what they need and the shared channels use the remainder. The power levels for the various channels are typically defined by the control unit 20.

Because the radio unit 40 is typically co-located in the field with the antenna, it is desirable to keep the size of the radio unit 40 as small as possible to control the overall size of the field portion of the RBS 10. As the size of the radio unit 40 is driven in large part by the cooling fins used to cool the radio elements in the radio unit 40, reducing the size of the radio unit 40 typically involves reducing the size and/or number of cooling fins. The size and/or number of cooling fins is driven by the amount of power dissipation and the operating temperature of the radio elements in the radio unit 40, and by the upper ambient temperature of the environment surrounding the radio unit 40. One conventional solution reduces the size and/or number of cooling fins by including a self-protection mechanism in the radio unit 40 that decreases the power of the transmission when the temperature meets or exceeds a predefined threshold, regardless of the power levels defined by the control unit 20. Such self-protection mechanisms therefore reduce the power of the common, dedicated, and shared channels. As a result, the conventional self-protection mechanisms are not always desirable because decreasing the power available to the common channel decreases the cell radius of the RBS 10, which may result in dropped calls, limited coverage, etc.

The present invention provides an alternative solution for controlling the size and/or number of cooling fins, and therefore the size, of the radio unit 40. According to one exemplary embodiment, the control unit 20 dynamically adjusts the maximum mean power $P_{max}$ available to the RBS 10 based on a temperature of the radio unit 40, allocates a currently desired portion of the maximum mean power to the control channel, e.g., the amount of power currently required for the control channel, determines an available power for the dedicated and shared channels based on the maximum mean power and the control channel power allocation, and allocates the available power to the dedicated and shared channels. In so doing, the control unit 20 of the present invention controls the temperature of the radio unit 40 without impacting the power of the control channel, and therefore, without impacting the cell radius. This enables the radio unit 40 to utilize smaller and/or fewer cooling fins, which enables the design and construction of a smaller radio unit 40.

Figure 3:
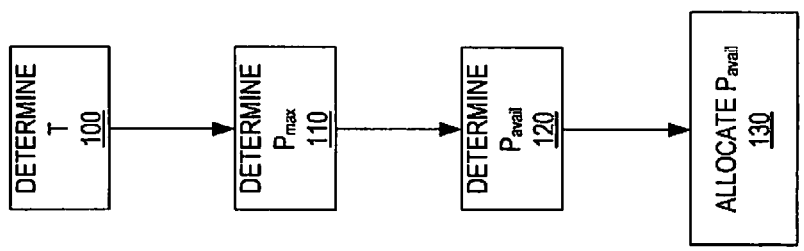
FIG. 3 shows a flow chart for an exemplary method according to the present invention.

FIG. 3 shows one exemplary method for the present invention. Radio unit 40 determines its temperature (block 100), determines a maximum mean power for transmissions from the radio unit 40 based on the temperature (block 110), and provides the maximum mean power to the control unit 20. The control unit 20 determines an available power for the dedicated and shared channels based on the maximum mean power (block 120) and allocates the available power to the dedicated and shared channels (block 130). As a result, the present invention facilitates controlling the power dissipation, and therefore the size of the radio unit 40, without adversely affecting the power of the common channels.

The RBS 10 in FIG. 1 shows one exemplary control unit 20 and radio unit 40 for implementing the present invention. The radio unit 40 includes radio control processor (RCP) 42, low power radio equipment (LPRE) 44, e.g., filters, modulators, low power amplifiers, etc., and high power radio equipment (HPRE) 46, e.g., high power amplifiers. The high power radio equipment 46 monitors its operating temperature (T) and reports the temperature to RCP 42. The RCP 42 estimates the energy dissipation of the radio unit 40 based on the reported temperature. In some cases, the RCP 42 also receives the average transmission power level ($P_{avg}$) from the low power radio equipment 44, and estimates the energy dissipation based on both the reported temperature and the average transmission power level. In any event, RCP 42 estimates the power dissipation of the radio unit 40 based on the energy dissipation estimate, and correspondingly, the maximum mean power for transmissions from the radio unit 40. The RCP 42 signals the estimated maximum mean power to control unit 20.

The control unit 20 includes a traffic control processor (TCP) 22, a power allocator 24, a common channel generator (CCG) 26, a dedicated channel generator (DCG) 28, a shared channel generator (SCG) 30, a shared channel scheduler 32, and a combiner 34. The TCP 22 receives the maximum mean power from the radio unit 40 and provides the maximum mean power to the power allocator 24. By having the TCP 22 receive and forward the maximum mean power from the RCP 42, the TCP 22 and RCP 42 hide their respective internal structures from each other. This helps to further separate the design of the control and radio units 20, 40.

In addition to receiving the maximum mean power, the power allocator 24 also receives an indication of the power allocated to the common channels, referred to herein as the common channel usage (U). Based on the common channel usage and the received maximum mean power, power allocator 24 determines the available power ($P_{avail}$). The power allocator 24 subsequently allocates power to the dedicated and shared channels based on the available power. The dedicated channel power allocation ($P_D$) is provided to the dedicated channel generator 28 to enable generation of dedicated transmissions ($T_D$) on the dedicated channels. The shared channel power allocation ($P_S$) is provided to the scheduler 32 for scheduling transmissions on the shared channel, and to the shared channel generator 30. The scheduler 32 outputs a scheduling decision to the shared channel generator 30 to control transmissions ($T_S$) on the shared channels using the allocated shared channel power. Further, the common channel generator 26 generates transmissions ($T_C$) on the common channel based on the common channel usage. The combiner 34 combines the transmissions for the common, dedicated, and shared channels, and provides the combined signal (S) to the radio unit 40 for transmission to the wireless communication device 12.

The power allocator 24 may allocate the available power to the dedicated and shared channels according to any desired protocol. In one embodiment, the allocation may be based on a priority of traffic variants in the cell serviced by the RBS 10. For example, the dedicated channels may be allocated as much of the available power as they want, and the remainder may be allocated to the shared channels. Alternatively, the dedicated channels may be allocated a percentage of the available power and the shared channels may be allocated the remainder of the available power.

In one embodiment, RBS 10 is part of an LTE communication system. For this embodiment, the common channel usage defines the amount of power used by the common channel generator 26 for transmissions during each sub-frame of a common channel transmission. The power allocator 24 uses the common channel usage to determine and control how much of the maximum mean power is available for each sub-frame of the dedicated and shared channel transmissions. In other words, the power allocator 24 determines the available power (the amount of the maximum mean power remaining after considering the common channel usage) for the dedicated and shared channels.

Figure 4A:
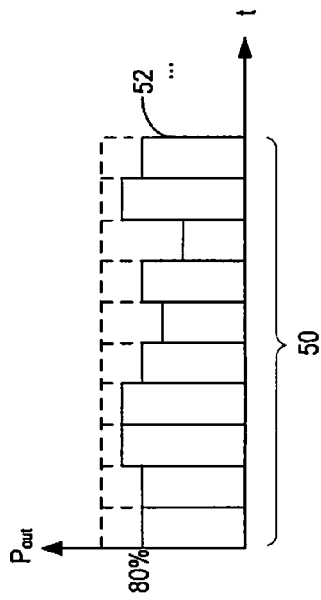
FIGS. 4A-4B show transmission diagrams for the present invention.

In one exemplary embodiment, the power allocator 24 controls the power of the dedicated and shared channels by controlling the average power level of the sub-frames across a set of sub-frames. For example, to reduce the power for the dedicated channels across a set 50 of ten sub-frames 52, the power allocator 24 may reduce the average transmission power relative to a previous average transmission power across the set 50 of sub-frames 52, as shown in FIG. 4A. The remaining available power is then allocated to the shared channels. Alternatively, the power allocator 24 may reduce the average transmission power across a set 50 of sub-frames 52 for both the dedicated and shared channels until the combined average power level across the set of sub-frames for the dedicated and shared channel transmissions is less than or equal to the available power.

Figure 4B:
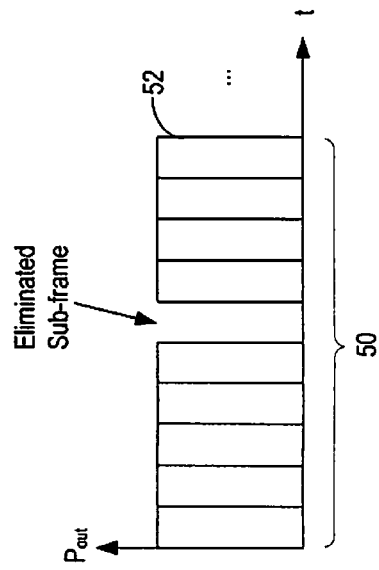

In another example, power allocator 24 may reduce the power of the dedicated and shared channels across a set 50 of ten sub-frames 52 by eliminating the user traffic transmissions in one or more of the sub-frames 52, as shown in FIG. 4B. For example, the power allocator 24 may provide a control signal 36 to the radio unit 40 to indicate, for each sub-frame 52, whether the radio unit 40 should use the sub-frame 52 or should enter a sleep mode for the sub-frame 52. This enables the active sub-frames 52 for the dedicated and/or shared channels to transmit at a higher than average power while still maintaining the average power across the set 50 at or below a desired portion of the available power.

Because the low and high power radio equipment 44, 46 may still be active even when traffic is eliminated for a particular sub-frame, the bias required to maintain the active state of the low and high power radio equipment 44, 46 results in some amount of power dissipation during the "eliminated" sub-frame. Thus, further power savings may be achieved by deactivating the low and high power radio equipment 44, 46 for the eliminated sub-frame. To facilitate the sub-frame elimination embodiment, RCP 42 may report the power savings achievable by eliminating transmissions on one or more sub-frames 52. For example, the RCP may report a 10 W maximum mean power and indicate that eliminating transmissions on 10% of the sub-frames 52 provides a 2 W bonus for the remaining sub-frames.

By eliminating transmissions in one or more sub-frames 52 of the dedicated and/or shared channels, the power required for common channel transmissions, and therefore the range of the cell for the LTE RBS 10 does not change. However, the time required to lock a wireless communication device 112 to the cell during a hand-over may be slightly affected. It will be appreciated that transmissions on any number of sub-frames may be eliminated. For time-division duplexing modes, for example, transmissions on up to 60% of the sub-frames 52 in a set 50 may be eliminated.

Figure 5:
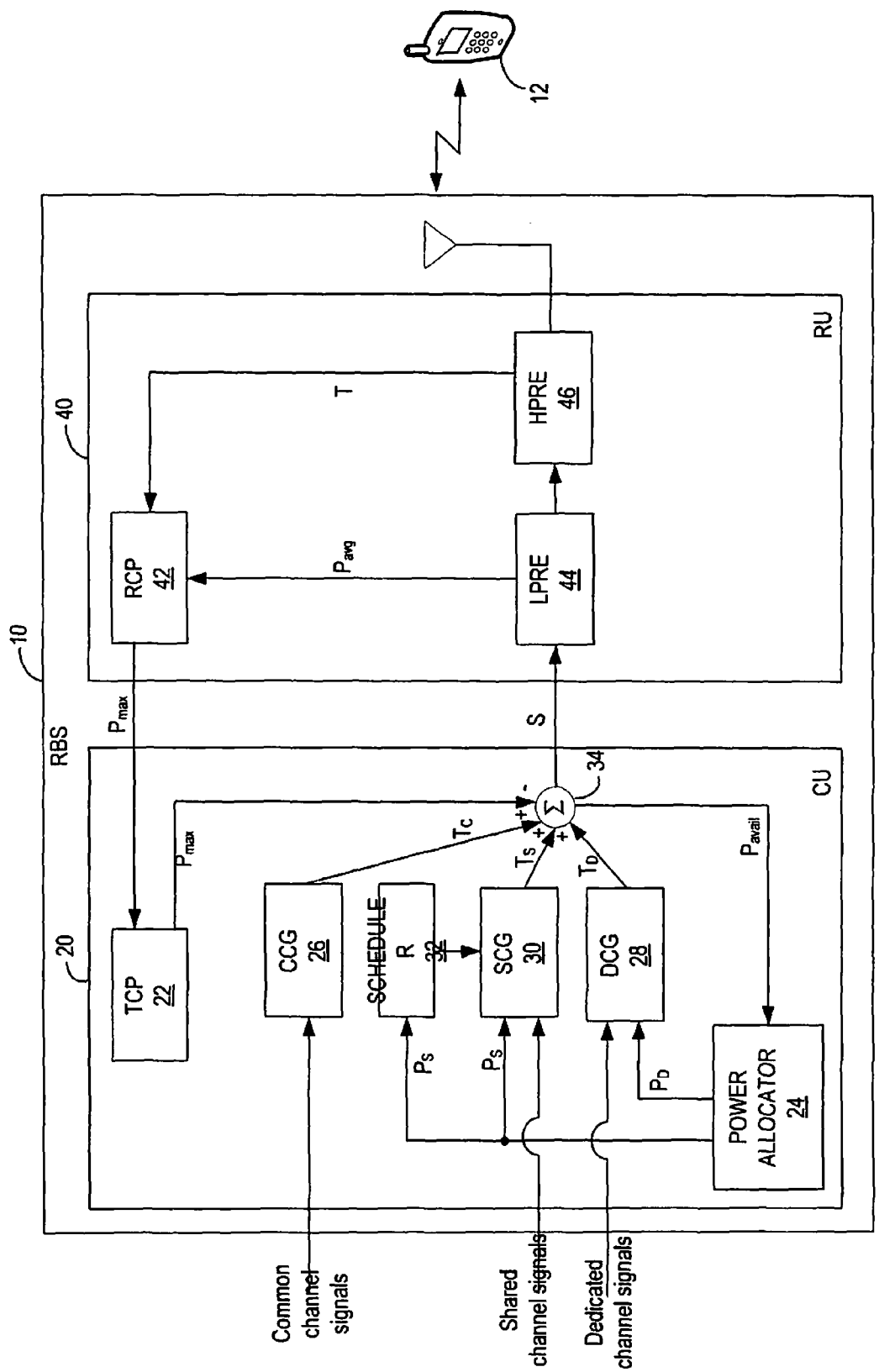
FIG. 5 shows a block diagram of a radio base station in communication with a wireless communication device according to another exemplary embodiment of the present invention.

FIG. 5 shows another exemplary RBS 10 for a WCDMA system. For this embodiment, the TCP 22 in the control unit 20 provides the maximum mean power to the combiner 34. The combiner 34 determines the difference between the maximum mean power and the sum of the power for current transmissions on the common, dedicated, and shared channels. The difference is provided to the power allocator 24 as the available power ($P_{avail}$). The power allocator 24 allocates the available power for subsequent transmissions on the dedicated and shared channels and provides the power allocations to the dedicated channel generator 28 and shared channel scheduler 32, respectively. The dedicated and shared channel generators 28, 30 generate the subsequent transmissions on the dedicated and shared channels based on the power allocations as discussed herein. For the WCDMA system, it will be appreciated that amplifiers in the radio unit 40 may not be fully deactivated. In any event, the common, dedicated, and shared channel transmissions produced by the common, dedicated, and shared channel generators, respectively, are combined by combiner 34 and provided to the radio unit 40 for transmission to the wireless communication device 12.

Figure 6:
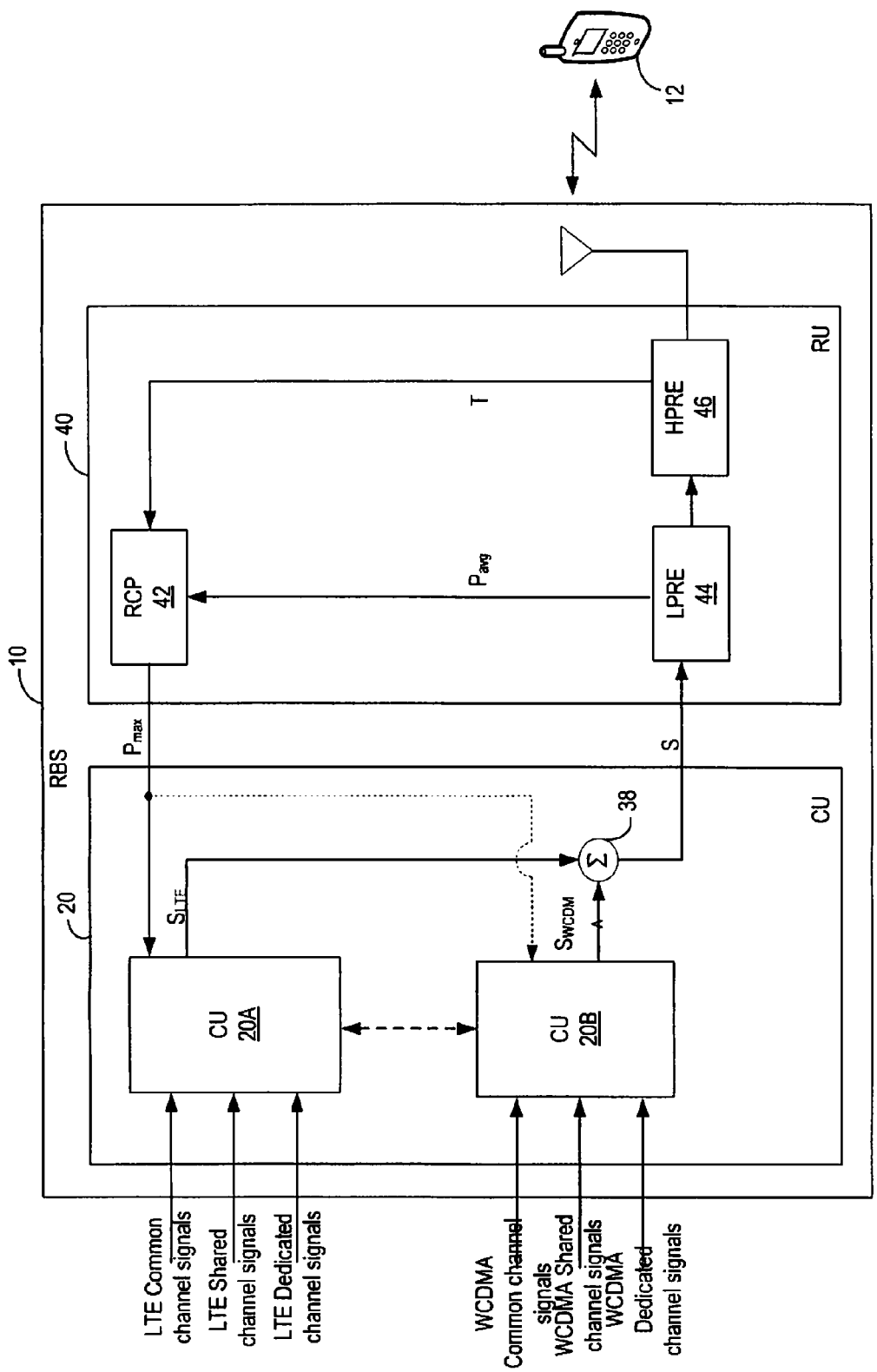
FIG. 6 shows a block diagram of a radio base station in communication with a wireless communication device according to another exemplary embodiment of the present invention.

The present invention may also apply to a system that implements two or more communication standards. For example, the wireless communication system may comprise a combination LTE and WCDMA system. While not required, the control unit 20 may comprise two or more control units 20 for this embodiment, e.g., an LTE control unit 20A and a WCDMA control unit 20B as shown in FIG. 6. While each control unit 20A, 20B may be designed according to any of the above-described embodiments, the details of the control units 20A, 20B are excluded from FIG. 6 for simplicity.

In one embodiment, the radio unit 40 informs the control units 20A, 20B of the maximum mean power derived from the temperature of the radio unit 40. In one embodiment, the radio unit 40 may allocate some portion of the maximum mean power to each control unit 20A, 20B. The allocation may be an equal allocation or may be according to some predetermined distribution ratio. Alternatively, the radio unit 40 may allocate some portion of the maximum mean power to each control unit 20A, 20B based on a predetermined priority. The control units 20A, 20B then determine and allocate the available power to the LTE and WCDMA dedicated and shared channels, as described above. A combiner 38, for example, may combine the signals for the LTE and WCDMA transmissions ($S_{LTE}$ and $S_{WCDMA}$, respectively), and provides the combined signal (S) to the radio unit 40 for transmission to the wireless communication device 12. While FIG. 6 shows the combiner 38 as part of the control unit 20, it will be appreciated that the combiner 38 may alternatively be part of radio unit 40.

In another embodiment, the radio unit 40 may inform both control units 20A, 20B of the maximum mean power. The LTE and WCDMA control units 20A, 20B then determine and allocate the available power based on the provided maximum mean power to the LTE and WCDMA dedicated and shared channels according to some predetermined allocation ratio, e.g., 50/50, 65/35, etc., and/or a predetermined priority. For example, the LTE control unit 20A may allocate 65% of the available power to the LTE dedicated channel(s) and the WCDMA control unit 20B may allocate 35% of the available power to the WCDMA dedicated channels. Alternatively, if WCDMA is prioritized over LTE, the LTE control unit 20A may apply decreases in the available power to the LTE dedicated channel until the available power for the LTE dedicated channel reaches a predetermined minimum. After that, the LTE and WCDMA control units 20A, 20B may share decreases in the available power to the LTE and WCDMA dedicated channels evenly or according to a predetermined ratio.

While the figures show the radio unit 40 providing the maximum mean power to the control unit 20, it will be appreciated that the radio unit may alternatively provide the temperature (T) and/or the average power ($P_{avg}$) to the control unit. In this scenario, the TCP 22 of the control unit 20 determines the maximum mean power based on the provided temperature and/or average power.

The present invention controls the temperature of the radio unit 40 by determining an available power for the dedicated and shared channels based on the temperature of the radio unit and allocates the available power to the dedicated and shared channels. This enables the common channel to transmit at a desired power level necessary to achieve a desired cell coverage area. Further, controlling the dedicated and shared channel power as described herein enables the radio unit 40 to utilize smaller cooling fins, which enables the construction of smaller radio units.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for controlling the transmission power of a radio base station comprising a radio unit and a control unit, the method comprising:
   determining a temperature of the radio unit;
   determining a power limit of the radio unit based on the temperature;
   allocating a desired amount of power to a first group of channels;
   determining an available power for a second group of channels based on the power limit and the allocated power for the first group of channels; and
   allocating the available power to the second group of channels.

2. The method of claim 1, wherein transmissions for the second group of channels occur in a set of sub-frames, and wherein allocating the available power comprises eliminating the transmission in a selected sub-frame of the set of sub-frames.

3. The method of claim 2, wherein eliminating the transmission in the selected sub-frame comprises deactivating one or more radio elements in the radio unit during the selected sub-frame.

4. The method of claim 1, wherein transmissions for the second group of channels occur in a set of sub-frames, and wherein allocating the available power comprises adjusting an average transmission power across the set of sub-frames.

5. The method of claim 1, wherein the wireless communication system comprises a combination of a Long Term Evolution (LTE) system and a Wideband Code Division Multiple Access (WCDMA) system, and wherein allocating the available power comprises allocating the available power for the second group of channels of the LTE system and the second group of channels of the WCDMA system according to a predetermined ratio.

6. The method of claim 1, wherein the wireless communication system comprises a combination of a Long Term Evolution (LTE) system and a Wideband Code Division Multiple Access (WCDMA) system, and wherein allocating the available power comprises allocating the available power for the second group of channels of the LTE system and the second group of channels of the WCDMA system according to a predetermined system priority.

7. The method of claim 1, wherein the radio unit comprises low power radio equipment, high power radio equipment, and a radio control processor, and wherein determining the power limit comprises determining the power limit at the radio control processor based on the determined temperature of the high power radio equipment and an average output power of the low power radio equipment.

8. The method of claim 1, wherein the control unit comprises a traffic control processor, and wherein determining the power limit comprises receiving at the traffic control processor the temperature from the radio unit and determining the power limit based on the received temperature.

9. The method of claim 1, wherein the control unit comprises a traffic control processor and a power allocator, the method further comprising providing the power limit from the traffic control processor to the power allocator.

10. The method of claim 9, further comprising receiving at the power allocator a usage associated with the allocated power for the first group of channels, and wherein determining the available power comprises determining the available power at the power allocator based on the power limit and the received usage.

11. The method of claim 1, wherein the control unit comprises a traffic control processor, a power allocator, one or more generators for the first group of channels, one or more generators for the second group of channels, and a combiner, and wherein determining the available power comprises:
   providing the power limit from the traffic control processor to the combiner;
   generating transmissions for the first and second groups of channels at the respective first and second groups of channel generators; and
   determining the available power at the combiner based on a difference between the power limit and power levels of the transmissions on the first and second groups of channels.

12. The method of claim 1, wherein the wireless communication system comprises one of a Long Term Evolution (LTE) system and a Wideband Code Division Multiple Access (WCDMA) system.

13. The method of claim 1 wherein the first group of channels comprises one or more common channels, and wherein the second group of channels comprises at least one of a dedicated channel and a shared channel.

14. A radio base station in a wireless communication system, the radio base station comprising a radio unit configured to determine a temperature of the radio unit, the radio base station characterized by:
   a control unit configured to:
      allocate a desired amount of power to a first group of channels;
      determine an available power for a second group of channels based on a power limit derived from the temperature and the allocated power for the first group of channels; and
      allocate the available power to the second group of channels.

15. The radio base station of claim 14, wherein transmissions for the second group of channels occur in a set of sub-frames, and wherein the control unit allocates the available power by eliminating the transmission in a selected sub-frame of the set of sub-frames.

16. The radio base station of claim 15, wherein the control unit eliminates the transmission in the selected sub-frame by deactivating one or more radio elements in the radio unit during the selected sub-frame.

17. The radio base station of claim 14, wherein transmissions for the second group of channels occur in a set of sub-frames, and wherein the control unit allocates the available power by adjusting an average transmission power across the set of sub-frames.

18. The radio base station of claim 14, wherein the wireless communication system comprises a combination of a Long Term Evolution (LTE) system and a Wideband Code Division Multiple Access (WCDMA) system comprising an LTE control unit and a WCDMA control unit, and wherein the LTE and WCDMA control units allocate the available power by allocating the available power for the second group of channels of the LTE system and the second group of channels of the WCDMA system according to a predetermined ratio.

19. The radio base station of claim 14, wherein the wireless communication system comprises a combination of a Long Term Evolution (LTE) system and a Wideband Code Division Multiple Access (WCDMA) system comprising an LTE control unit and a WCDMA control unit, and wherein the LTE and WCDMA control units allocate the available power by allocating the available power for the second group of channels of the LTE system and the second group of channels of the WCDMA system according to a predetermined system priority.

20. The radio base station of claim 14, wherein the radio unit comprises low power radio equipment, high power radio equipment, and a radio control processor, and wherein the radio control processor is configured to:
 determine the power limit based on the determined temperature of the high power radio equipment and an average output power of the low power radio equipment; and
 provide the determined power limit to the control unit.

21. The radio base station of claim 14, wherein the control unit comprises a traffic control processor configured to receive the temperature from the radio unit and to determine the power limit based on the received temperature.

22. The radio base station of claim 14, wherein the control unit comprises a traffic control processor and a power allocator, and wherein the traffic control processor is configured to:
 receive the power limit from the radio unit; and
 provide the received power limit to the power allocator.

23. The radio base station of claim 22, wherein the power allocator receives a usage associated with the allocated power for the first group of channels, and wherein the power allocator determines the available power based on the received power limit and the received usage.

24. The radio base station of claim 14, wherein the control unit comprises a traffic control processor, a power allocator, one or more generators for the first group channels, one or more generators for the second group of channels, and a combiner, and wherein combiner determines the available power by:
 receiving the power limit from the traffic control processor;
 receiving transmissions from the generators for the first and second groups of channels; and
 determining the available power based on a difference between the power limit and power levels of the transmissions on the first and second groups of channels.

25. The radio base station of claim 14, wherein the wireless communication system comprises one of a Long Term Evolution (LTE) system and a Wideband Code Division Multiple Access (WCDMA) system.

26. The radio base station of claim 14, wherein the first group of channels comprises one or more common channels, and wherein the second group of channels comprises at least one of a dedicated channel and a shared channel.

\* \* \* \* \*

UNITED STATES PATENT AND TRADEMARK OFFICE
CERTIFICATE OF CORRECTION

PATENT NO. : 8,358,972 B2
APPLICATION NO. : 12/866155
DATED : January 22, 2013
INVENTOR(S) : Englund et al.

Page 1 of 1

It is certified that error appears in the above-identified patent and that said Letters Patent is hereby corrected as shown below:

On the Title Page, in Item (75), under "Inventors", in Column 1, Lines 1-2,
delete "Jacob Osterling, Jarffalla (SE)" and
insert -- Jacob Österling, Järffälla (SE) --, therefor.

In the Drawings:

In Fig. 6, Sheet 5 of 5, delete "$S_{WCDM}$" and insert -- $S_{WCDMA}$ --, therefor.

Signed and Sealed this
Fourteenth Day of May, 2013

Teresa Stanek Rea
*Acting Director of the United States Patent and Trademark Office*